United States Patent [19]

Garthwaite

[11] Patent Number: 4,873,951
[45] Date of Patent: Oct. 17, 1989

[54] CONNECTING ROD WITH POLYMERIC COATED SIDEFACE

[75] Inventor: Steven C. Garthwaite, Fond du Lac, Wis.

[73] Assignee: Brunswick Corporation, Skokie, Ill.

[21] Appl. No.: 286,514

[22] Filed: Dec. 19, 1988

[51] Int. Cl.[4] ............................................. F01M 1/00
[52] U.S. Cl. ................................ 123/196 W; 74/583; 384/123
[58] Field of Search .................. 123/197 AB, 197 AC, 123/196 W; 384/299, 300, 294, 420, 430; 74/579 E, 594

[56] References Cited

U.S. PATENT DOCUMENTS

| | | | |
|---|---|---|---|
| 775,923 | 11/1904 | Holmes . | |
| 2,738,687 | 3/1953 | Meile | 384/430 |
| 2,850,334 | 9/1958 | Hurley | 384/299 |
| 3,144,786 | 8/1964 | Dale . | |
| 4,213,659 | 7/1980 | Tielemans et al. | 384/430 |
| 4,244,332 | 1/1981 | Kusche et al. . | |
| 4,305,351 | 12/1981 | Staerzl . | |
| 4,436,443 | 3/1984 | McCormick . | |
| 4,450,754 | 5/1984 | Liljequist | 123/193 P |
| 4,702,202 | 10/1987 | Hensel et al. . | |
| 4,770,547 | 9/1988 | New | 384/420 |
| 4,771,744 | 9/1988 | Corbett . | |
| 4,784,499 | 11/1988 | Fukute | 384/441 |

*Primary Examiner*—David A. Okonsky
*Attorney, Agent, or Firm*—Andrus, Sceales, Starke & Sawall

[57] ABSTRACT

In a two-cycle internal combustion engine (2), the sidefaces (60, 62) of the connecting rod (48) have a polymeric material coating thereon, such as polytetrafluoroethylene, PTFE, providing a bearing between the sidefaces (60, 62) and the crankfaces (38, 40) of the crankarm discs (34, 36) of the crankshaft (24), to prevent galling and eliminate the need to silver plate the sidefaces (60, 62).

15 Claims, 2 Drawing Sheets

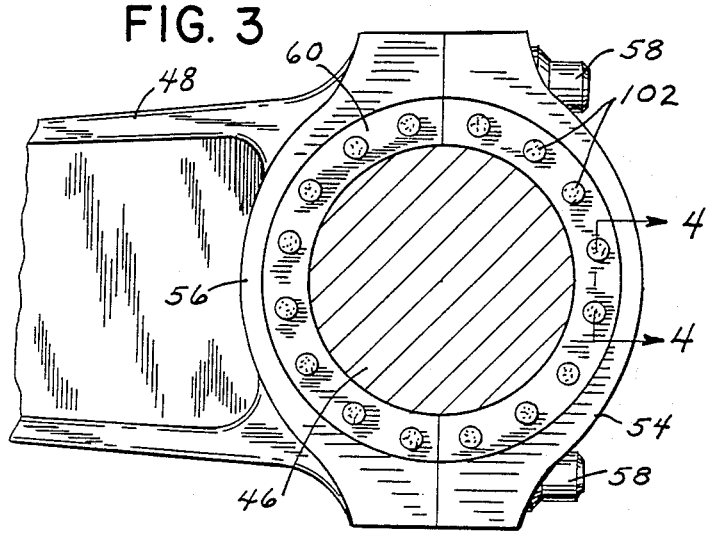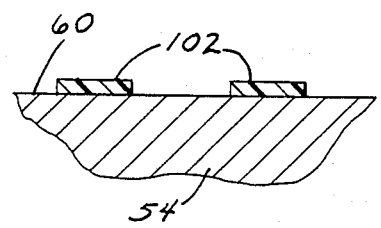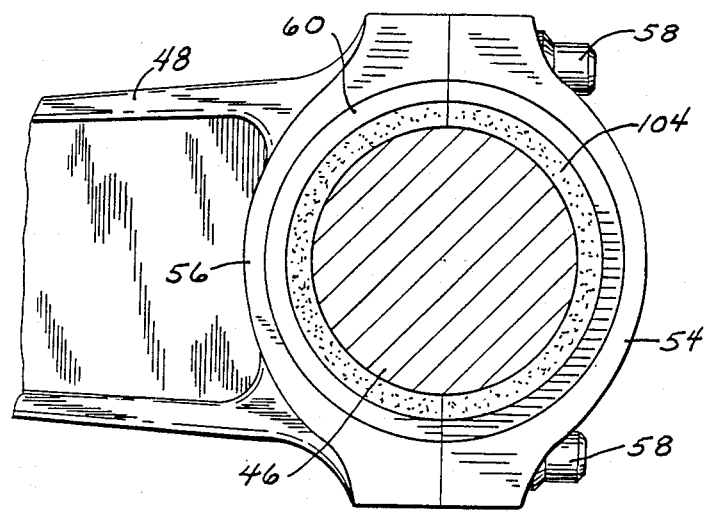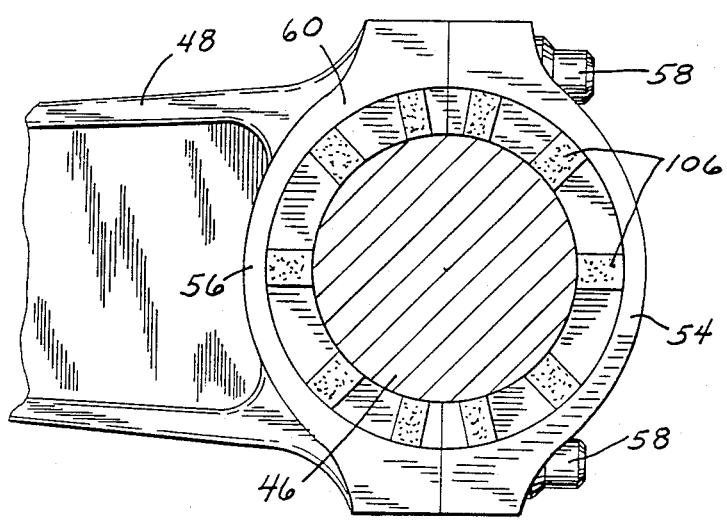

CONNECTING ROD WITH POLYMERIC COATED SIDEFACE

BACKGROUND AND SUMMARY

The invention relates to connecting rods for two-cycle internal combustion engines.

In two-cycle internal combustion engines, the sidefaces of the connecting rods at their crank ends are typically silver plated to bear the frictional rubbing contact with the crankarms or discs of the crankshaft. The expense of silver plating is objectionable.

In the electroplating process, an initial pre-cleaning step is performed, followed by masking. Masking is an expensive process of painting the rods and then removing the mask in selected areas. An oil film must then be applied for corrosion control, and typically the parts are then shipped to an electroplating plant. The electroplaters then must the clean the rods again, and then silver plate. After plating, the rods must be baked immediately at about 350° F. for four hours minimum to prevent hydrogen embrittlement. The rods must then be allowed to cool to ambient temperature, and returned to the manufacturing plant. The rods then must be vibrated in a steel media to remove the meniscus edge which has been built up. The rods must then be inspected for thickness and adhesion of the silver plating.

In the present invention, the rods are cleaned, and then a polymeric coating having a low coefficient of sliding friction is applied, followed by curing for about 30 minutes, and an inspection for thickness. The rods are then passed on to the next operation. The invention solves prior problems of poor adhesion of the mask or silver plating. The invention eliminates: one of the prior cleaning processes; prior corrosion control problems; prior shipping requirements; the prior baking requirement for preventing hydrogen embrittlement; the prior vibration operation; the flow of parts back and forth from the shipping dock and to an electroplating plant. The invention also eliminates or reduces work in process and improves line flow. The invention thus significantly reduces production cost.

The invention also reduces the coefficient of friction to prevent galling, premature wear, friction welding, and heat generation by the two rotating and/or sliding members. The coating can be applied by a spray, brush, silk screen, etc.

BRIEF DESCRIPTION OF THE DRAWINGS

FIG. 3 is an enlarged end view of a portion of the connecting rod of FIG. 2.

FIG. 4 is an enlarged sectional view taken along line 4—4 of FIG. 3.

FIG. 5 is a view like FIG. 3 and shows an alternate embodiment.

FIG. 6 is a view like FIG. 3 and shows an alternate embodiment.

DETAILED DESCRIPTION

Prior Art

Figure 1:
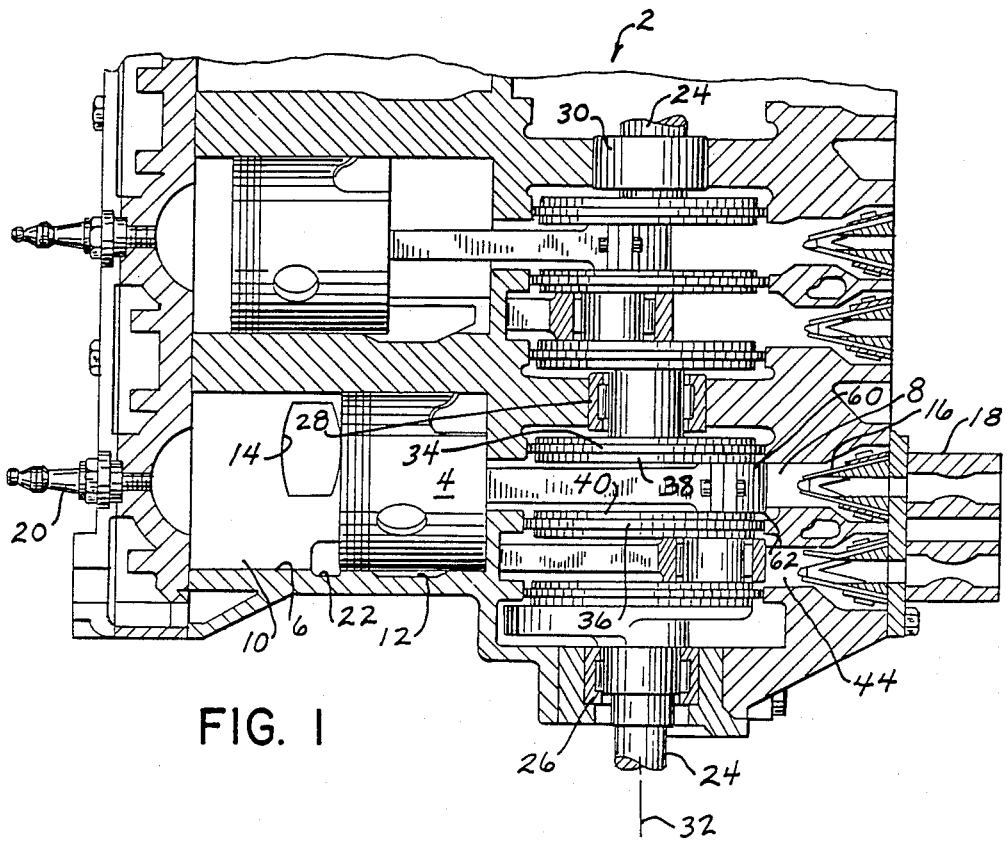
FIG. 1 is a sectional view of a two-cycle internal combustion engine.

FIG. 1 shows a two-cycle internal combustion engine 2 and is taken from Corbett U.S. Pat. No. 4,771,744, incorporated herein by reference. The engine has a plurality of pistons 4 each reciprocal in a cylinder 6 between a crankcase chamber 8 and a combustion chamber 10. Crankcase chamber 8 contains a fuel-air-lubricant mixture for lubricating the engine and for supplying a combustable mixture through transfer passage 12 and intake port 14 to combustion chamber 10. The mixture is supplied to crankcase chamber 8 through one-way reed valves 16 from a carburetor, schematically shown at 18, or by means of fuel injection. FIG. 1 shows a portion of one bank of cylinders in a V-engine, for which further reference may be had to Kusche et al U.S. Pat. No. 4,244,332, Staerzl U.S. Pat. No. 4,305,351, and Hensel et al U.S. Pat. No. 4,702,202, incorporated herein by reference. The present invention has broad application to various types of two-cycle engines.

Piston 4 moves to the left during its intake stroke, drawing a fuel-air-lubricant mixture through one-way reed valves 16 into crankcase chamber 8. Piston movement to the left also compresses the mixture in combustion chamber 10 for ignition by spark plug 20, which combustion drives piston 4 to the right, generating its power stroke. During movement of piston 4 to the right, the movement in crankcase chamber 8 is blocked by one-way reed valves 16 from exiting the crankcase, and instead is driven through transfer passage 12 to intake port 14 in combustion chamber 10 for compression during the intake stroke, and so on to repeat the cycle, all as is well known. The combustion products are exhausted at port 22.

The engine has a crankshaft 24 rotatably journaled at main bearings 26, 28, 30 and so on, along a crankshaft center-line 32. Crankshaft 24 has a plurality of sealing discs such as 34 and 36 which separate and isolate adjacent crankcase chambers and which also provide crankarms having facing crankfaces such 38 and 40. Crankarm disc 36 has an outer circumferential seal ring 42, FIG. 2, separating and isolating crankcase chamber 8 from crankcase chamber 44, as is standard in the art. Crankarm discs 34 and 36 extend radially outwardly from crankshaft centerline 32.

Figure 2:
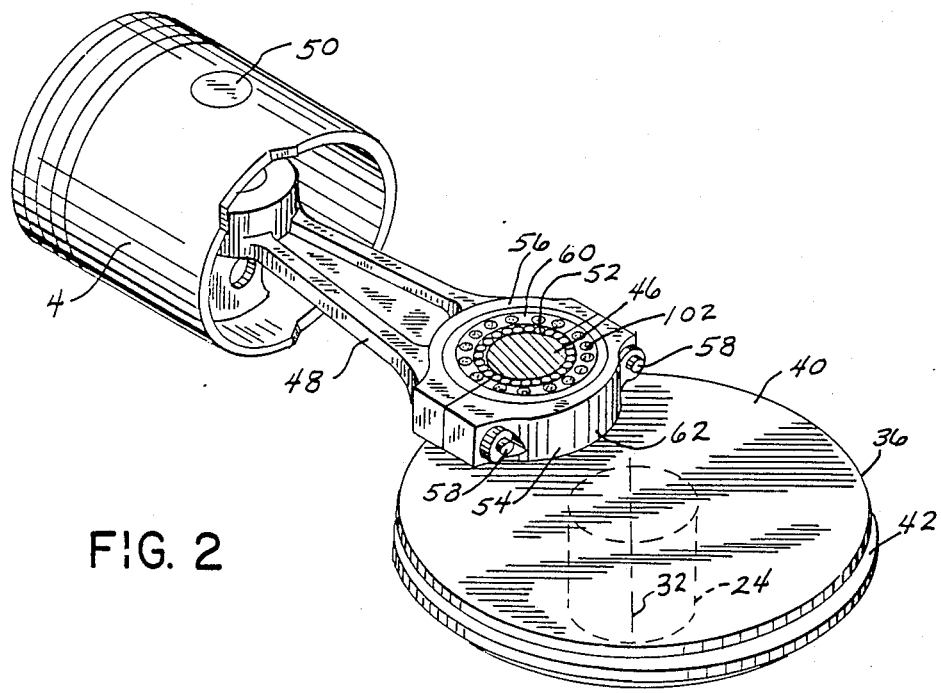
FIG. 2 is a perspective view of a connecting rod in accordance with the invention.

A crankpin 46, FIG. 2, extends axially between crankarms 34 and 36 integrally and perpendicularly from crankfaces 38 and 40 and parallel to and eccentrically offset from center-line 32. Piston 4 has a connecting rod 48 having a left end rotatably journaled to the piston by piston pin 50, and having a right end rotatably journaled on crankpin 46, with roller or needle bearings 52 if desired, for which further reference may be had to McCormick U.S. Pat. No. 4,436,443, incorporated herein by reference. The connecting rod has an end cap 54 mounted to saddle portion 56 by bolts 58.

Connecting rod 48 has sidefaces 60 and 62 slide along respective crankfaces 38 and 40 of respective crankarm discs 34 and 36. Because of the rotary frictional rubbing of the surfaces, sidefaces 60 and 62 of the connecting rod are typically silver plated. The above noted incorporated Corbett U.S. Pat. No. 4,771,744 shows an alternative with a hydrodynamic bearing provided by grooves or reliefs cut on the sidefaces of the connecting rod, with a very low angle to the sideface, and with radiused corners, to provide the hydrodynamic bearing and allow the sideface of the connecting rod to ride on a layer of lubricant.

PRESENT INVENTION

In the present invention, a polymeric material coating having a low coefficient of sliding friction provides a bearing between the sidefaces 60 and 62 of the connecting rod and the respective crankfaces 38 and 40 of respective crankarms 34 and 36, to prevent galling and eliminate the need to silver plate the sidefaces 60 and 62 of connecting rod 48. In the preferred embodiment, the polymeric material is a polytetrafluoroethylene coating, PTFE, teflon, for example obtainable from the Whitford Corporation under the tradename XYLAN, and also for example silver stone. Another type of plastic material which may be used is nylon, or a coating obtainable from AMOCO Corporation under the tradename TORLON.

In one form, the polymeric material coating is a series of dots 102, FIGS. 3 and 4, applied to the sideface of the connecting rod by silk screening or the like. The dots are radially outwardly of crankpin 46 and form an annulus therearound. The dots are spaced from one another along the circumference of the annulus.

In another embodiment, the polymeric material coating is a solid annulus 104, FIG. 5, masked onto the sideface of the connecting rod concentric to crankpin 46.

In another embodiment, the polymeric material coating is provided by a plurality of strips or pads 106, FIG. 6, on the sideface of the connecting rod and extending radially outwardly relative to crankpin 46. Pads 106 are attached by a fuel resistant epoxy to the connecting rod sideface.

The preferred and lowest cost method of application of the polymeric material is to coat the entire rod, and then remove the coating from those areas where it is not desired.

It is recognized that various equivalents, alternatives and modifications are possible within the scope of the appended claims.

I claim:

1. A two-cycle internal combustion engine comprising a piston reciprocal in a cylinder between a crankcase chamber and a combustion chamber, said engine having a crankshaft rotatably journaled therein along a crankshaft center-line, said crankshaft having a plurality of crankarms extending radially relative to said center-line, said crankarms having facing crankfaces, a crankpin extending axially between a pair of said crankarms perpendicularly from said crankfaces and parallel to and eccentrically offset from said crankshaft center-line, said piston having a connecting rod rotatably journaled on said crankpin, said connecting rod have sidefaces sliding along said crankfaces of said crankarms, said sidefaces of said connecting rod having a polymeric material coating thereon having a low coefficient of sliding friction and providing a bearing between said sidefaces of said connecting rod and said crankfaces of said crankarms to prevent galling and eliminate the need to silver plate said sidefaces of said connecting rod.

2. The invention according to claim 1 wherein said polymeric material is a plastic material.

3. The invention according to claim 2 wherein said plastic polymeric material is polytetrafluoroethylene, PTFE.

4. The invention according to claim 2 wherein said plastic polymeric material is a nylon material.

5. The invention according to claim 1 wherein said polymeric material is silk screened onto said sidefaces of said connecting rod.

6. The invention according to claim 1 wherein said polymeric material is masked onto said sidefaces of said connecting rod.

7. The invention according to claim 1 wherein said polymeric material is epoxyed onto said sidefaces of said connecting rod.

8. The invention according to claim 1 wherein said polymeric material is a series of dots on said sidefaces of said connecting rod.

9. The invention according to claim 8 wherein said dots are radially outward of said crankpin and form an annulus therearound, said dots being spaced from one another along the circumference of the annulus.

10. The invention according to claim 9 wherein said dots are silk screened onto said sidefaces of said connecting rod.

11. The invention according to claim 1 wherein said polymeric material is a continuous annulus on said sideface of said connecting rod concentric to said crankpin.

12. The invention according to claim 11 wherein said annulus is masked onto said sideface of said connecting rod.

13. The invention according to claim 1 wherein said polymeric material comprises a plurality of strips on said sidefaces of said connecting rod, said strips extending radially outwardly relative to said crankpin.

14. The invention according to claim 13 wherein said strips are epoxyed to said sideface of said connecting rod.

15. The invention according to claim 1 wherein said rod is coated with said polymeric material, and then the coating is removed from those areas where it is not desired.

* * * * *